May 31, 1938.   J. H. BALLARD   2,119,035
PISTON RING PROCESS
Filed March 29, 1937

Inventor
John Howard Ballard
By Liverance and Van Antwerp
Attorneys

Patented May 31, 1938

2,119,035

UNITED STATES PATENT OFFICE 2,119,035

PISTON RING PROCESS

John Howard Ballard, Muskegon, Mich., assignor to Sealed Power Corporation, Muskegon, Mich., a corporation of Michigan Application March 29, 1937, Serial No. 133,568

2 Claims. (Cl. 29—156.6)

This invention relates to a method or process of producing piston rings and particularly piston rings in which a groove made in the outer curved surface between the opposed parallel flat surfaces of the ring is filled with a metal different than the metal from which the piston ring is made. For example, such groove may be filled with bronze, zinc, tin, lead or any other desired or selected metal. Prior processes which have been used include the steps of producing the ring with the groove therein and then rolling and pressing a length of wire of the desired metallic substance into the groove, the wire being compressed and distorted or upset in shape so as to conform to the cross section of the groove. With such prior processes the machining of the groove must be exceptionally accurate and the dimensions of the wire used in the length thereof accurate in cross section, otherwise the finished ring produced will be defective.

With my present invention a very simple and economical process of filling such grooves in piston rings is utilized and results in the production of substantially perfect finished rings and without the necessity of close accuracy in machining the grooves. The process or method which I have invented is one which can be introduced into the regular production line for manufacturing the rings. The cost over the old method of rolling and pressing the different metals into the piston ring groove is greatly reduced and with the production of a much more uniform and perfect product.

For an understanding of the invention, reference may be had to the following description, taken in connection with the accompanying drawing, in which, Fig. 1 is a perspective view illustrating an arbor upon which a large number of rings may be located at a stage of their manufacture and after cutting the grooves therein which are to be filled with the different type or character of metal.

Like reference characters refer to like parts in the different figures of the drawing.

Figures 1, 2, 3, 4, 5, 6:
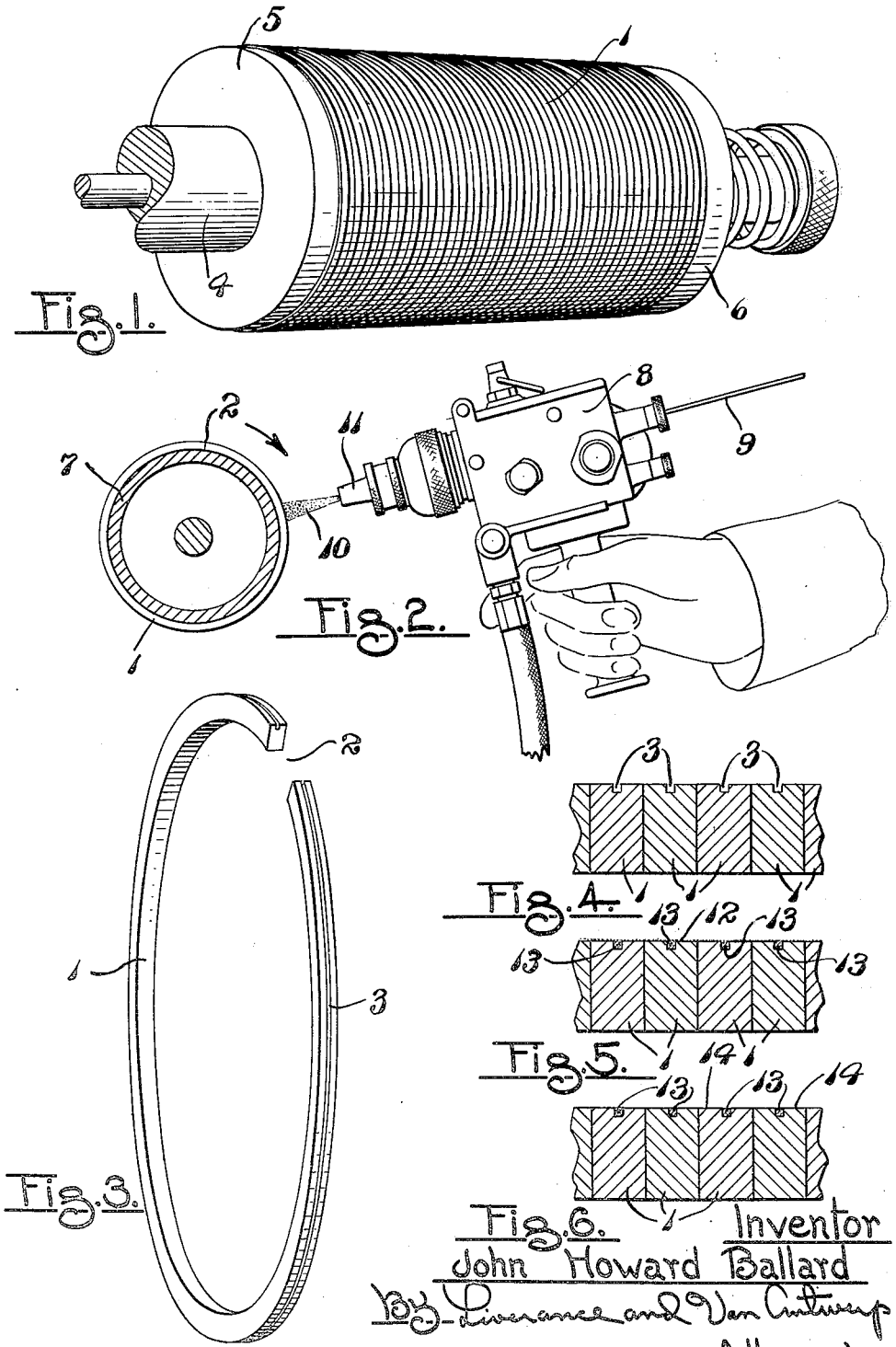
Fig. 2 is a section and side elevation illustrating the application of the metal to the rings.
Fig. 3 is a perspective view of a single ring showing the groove cut therein around the same at its outer curved side.
Fig. 4 illustrates in cross section the location of a plurality of rings side by side upon the mandrel as their outer surfaces appear after the groove has been cut in each ring.
Fig. 5 is a similar section showing the rings after the application of the groove filling metal thereto.
Fig. 6 is a like section showing the rings after a roughing cut thereon as shown in Fig. 5 to remove surplus metal.

The piston rings, one of which is shown in Fig. 3, are usually of rectangular cross sectional area as indicated at 1, being parted at one side as at 2, the ring also showing a groove 3 therearound in its outer curved side. The rings normally spring open at the parting a predetermined distance when free to do so, but when the parting is closed the ring assumes a substantially perfectly circular form. The rings are usually made from individual ring castings of an out-of-round form, that is, the casting will take substantially the form of the ring shown in Fig. 3 but with the parting at 2 filled with an integrally cast segment. The ring castings are properly machined and finished at their opposed flat sides and the segments cut out to provide the partings at 2. When the process of manufacturing the rings has reached this stage it is then ready for a utilization of my invention.

A plurality of the rings are located side by side over a suitable mandrel which includes a shaft 4 and spaced apart collars or heads 5 and 6 which are disposed on the shaft in conjunction with a cylinder 7 over which the rings are placed, the two heads being used to clamp the rings together side by side with the ring partings at 2 closed such that in this position the rings take a perfectly circular form and are ready for machining at their outer curved sides. This particular manner of holding rings, a plurality of them side by side and clamped on a mandrel with the partings in the rings closed, is not new and has long been used. With respect to the mandrel there is no novelty in its construction and the specific structure of the mandrel and how it is specifically operated is not detailed herein, and many other specific mandrel forms may be used.

For my invention, the rings shown in Fig. 1 have previously been subjected to a rough cutting machine operation on a similar mandrel in a machine similar to or like a lathe, the rings removed from the mandrel and the grooves 3 cut therein, by milling said grooves in the outer curved surfaces of the rings in the usual and well known manner. Then, a plurality of the grooved rings are placed upon the mandrel, as in Fig. 1, clamped with the partings in the rings substantially closed and the rings are then ready for utilization of my invention to apply metal to the rings and to fill the grooves. The grooves in the rings may extend from one end of the parting to the other as shown, or in some cases, the ends of the grooves may run out to the outer surfaces of the rings short distances from each end of the parting.

The next step of the process is to apply the metal to the grooved rings which are still held on the mandrel. In Fig. 2 there is shown an apparatus at 8 in which a wire 9 of the particular selected metal feeds into the apparatus. It is melted in the apparatus usually by an oxyacetylene gas flame and the melted metal is projected in a spray, as indicated at 10, from a nozzle 11 usually under the power of a stream of compressed air. The spray of metal 10 is in melted form and fills the grooves 3 in the rings and may make a slight coating, as at 12, on the outer curved surfaces of the rings. The grooves 3 are filled as indicated at 13. This application of molten metal to various metal surfaces is not in itself new and the specific structure and operation of the apparatus shown at 8 need not be outlined.

After the application of the liquid metal and after it has cooled and solidified, the rings still held and clamped on the mandrel, are machined in regular metal lathe fashion to remove any thin coating of surplus metal, such as at 12, at the outer curved surfaces of the rings and machines across the metal at 13 which fills the grooves 3 so that the surface at the outer sides of the metal at 13 is flush with the outer curved surface of the rings. In large rings it may be desirable to have the metal at 13 project slightly beyond the surfaces of the rings.

It is therefore apparent that with this invention there is a very rapid application of the different character of metal than that from which the rings are made in the grooves, one of which like that at 3 is in the outer curved side of each ring. It will further be apparent that from the standpoint of the utilization of the process it makes no difference whether the grooves 3 in a ring or rings are accurately machined so as to be of very exact and uniform width at all parts as the application of the melted metal will fill the groove irrespective of its shape and whether or not it is of close accuracy in dimensions. The step of applying the metal between the first roughing machining and the finishing is one which can be utilized directly in the production line in a factory. Therefore, there is substantial economy in manufacture, and the process is one which lends itself perfectly to quantity production, low cost of manufacture methods.

Having thus fully described my invention what I claim as new and desire to secure by Letters Patent is:

1. The method of manufacturing piston rings which consists, in providing a ring having a parting in one side, finishing said ring on its opposite parallel flat sides, roughly finishing said ring at its outer curved side to oversize and cutting a groove around the ring therein, projecting fluid metal in said groove to fill the same and solidify therein and then finishing the outer curved side of the ring to size.

2. The method of manufacturing piston rings which consists in taking a plurality of individually cast rings, parting them each at one part of their peripheries and finishing the opposed parallel flat sides thereof, placing said plurality of rings on a rotatable arbor, compressing the rings to close the partings and clamping the rings against each other to hold them in closed position, rotating said arbor and roughly finishing said rings to oversize at their outer curved sides, cutting a groove around each of the rings between its flat sides at its outer curved side, projecting fluid metal against said rings while they are rotating to fill said grooves, the metal solidifying and being retained in the grooves, and then finishing said rings at their outer curved sides to size, as specified.

JOHN HOWARD BALLARD.